Feb. 20, 1940.　　　　F. N. ROSS　　　　2,191,193
METHOD OF MAKING CLINCH-ON NUTS AND THE LIKE
Original Filed Nov. 7, 1935　　　2 Sheets-Sheet 1

Inventor
Frederick N. Ross
Frease and Bishop
Attorneys

Feb. 20, 1940.  F. N. ROSS  2,191,193
METHOD OF MAKING CLINCH-ON NUTS AND THE LIKE
Original Filed Nov. 7, 1935  2 Sheets-Sheet 2
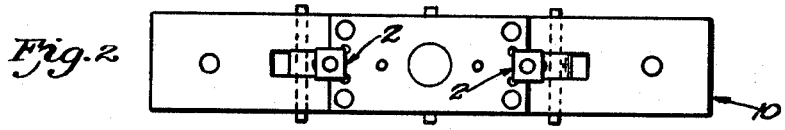
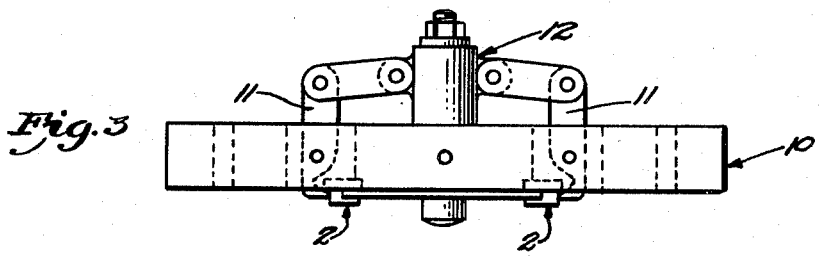
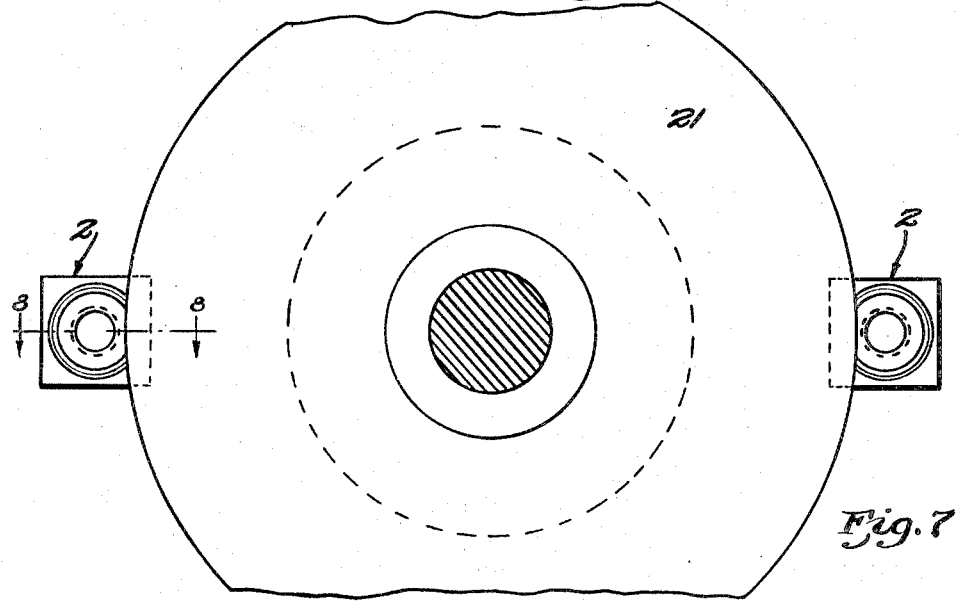
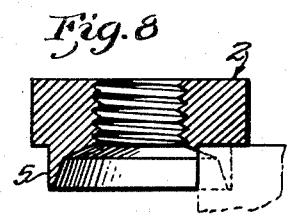
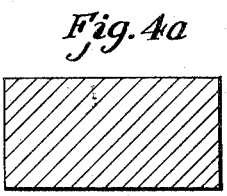
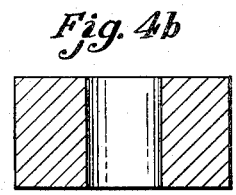
Inventor
Frederick N. Ross
By
Fraser and Bisley
Attorneys Patented Feb. 20, 1940

2,191,193

UNITED STATES PATENT OFFICE

2,191,193

METHOD OF MAKING CLINCH-ON NUTS AND THE LIKE

Frederick N. Ross, Grosse Pointe Park, Mich., assignor to Ash Products Corporation, Detroit, Mich., a corporation of Michigan Division of application Serial No. 140,217, May 1, 1937, which is a continuation of application Serial No. 48,610, November 7, 1935. Serial No. 140,217 divided and this application August 15, 1938, Serial No. 224,913

12 Claims. (Cl. 10—86)

The present application for United States Letters Patent of which this specification is a part constitutes a division of my application for United States Letters Patent, Serial No. 140,217, filed May 1, 1937, said application Serial No. 140,217 constituting a continuation of my application for United States Letters Patent, Serial No. 48,610, filed November 7, 1935, and the present application constituting a division and a continuation of said application Serial No. 48,610.

This invention relates to methods of making clinch-on nuts and the like, and has to do particularly with simple and inexpensive fabrication of blanks having opposite faces, preferably flat blanks such as standard nuts, to produce clinch-on nuts having novel characteristics.

Heretofore there have been three general types of clinch-on nuts used in the industry, one being the D type clinch-on nut made as a screw machine product; the second being the cage type of clinch-on nut wherein a standard nut is enclosed in a sheet metal cage, which cage performs a clinching operation; and a third type wherein a bar of special shape is cut off and fabricated so as to produce ear members which perform the clinch-on operation, one assembly being that shown in the Mitchell United States Letters Patent No. 1,852,978.

Any clinch-on nut may be stated to be an attachment article of manufacture, including a flange or a head with a seat face and a shank extending from the seat face, the shank being adapted for insertion into an aperture of the sheet material usually sheet metal in which the nut is applied, and the seat face of the flange being adapted for abutting against one face of the sheet material, and the extremity of the shank extending beyond the other face of the sheet material being adapted to be clinched over against the other face of the sheet material in opposition to the flange.

It is very desirable in the use of clinch-on nuts to prevent turning of the shank in the apertures in which they are inserted, and for this purpose the shanks are preferably multi-cornered and are inserted into multi-cornered apertures.

The production of an attachment article with a multi-cornered shank and a flange with a seat face extending entirely around the shank has prior to the present improvements been relatively difficult and expensive.

The object of the present invention is to provide a method for making a clinch-on nut and the like which utilizes a blank having opposite faces, preferably a flat blank, such as a standard nut, such as heretofore used in connection with cage type nuts, but which eliminates the cage, in that a portion of the wall of the nut itself is so fabricated as to provide a clinch-on structure; this produces a clinch-on nut which is much cheaper than the cage or screw machine type. It further provides a nut which makes it very easy to find a thread, which provides a seat all the way around the clinch-on portion to give greater strength, and which when assembled is a thin, neat-appearing nut.

A further object of the invention is to provide a method for making an attachment article having a multi-cornered shank adapted to be formed by machining a blank entirely by rotary cutting operations, so as to enable the attainment of minimum production costs.

A further object of the invention has to do with a method carried out by a machine for continuously fabricating the improved clinch-on nuts from blanks having opposite faces, preferably flat blanks such as standard nuts, said machine being so arranged and constructed as to fabricate and form the clinch-on part of the nut in two operations and to form the clinch-on portion in a D or C shape in another operation.

The foregoing and other objects are attained by the methods of making attachment articles of manufacture, and parts, which comprise the present invention, and the nature of which is set forth in the following general statement, and preferred embodiments of which articles and of a machine for carrying out the methods are set forth by way of example in the following description, and which are particularly and distinctly pointed out and set forth in the appended claims forming part hereof.

The nature of the improved attachment article made by the improved methods hereof may be stated in general terms as including preferably in a one piece metal article made from a blank having opposite faces preferably by rotary cutting machining operations performed entirely upon one face of the blank, a flange having a transverse seat face, and a shank extending from the flange seat face, the shank having side faces, each side face being curved and preferably cylindric, the preferably cylindric side faces having different centers of curvature, and the shanks having a plurality of corners formed by side edges of the curved faces.

Such a shank may have a transverse cross-section which is generally in the form of a D or C.

From another standpoint, the improved attachment article may be described as including a body having two opposite transverse end faces, side faces bounding the end faces, and curved or arcuate rabbets between one of the end faces and the side faces, each rabbet having a transverse seat face located between the end faces and a curved preferably cylindric arcuate face at an angle with the seat face and the one end face.

The improved articles are preferably made by the improved methods hereof which may be stated in general terms as including cutting a plurality of curved or arcuate rabbets in one end portion of a blank having opposite end faces, preferably by feeding rotary cylindric end cutting tools endwise along their axes of rotation into one end face of the blank.

Other features of the invention have to do with details of the methods and the construction and arrangement of the fabricating machine, as is more clearly set forth in the specifications and claims.

In the drawings; by way of example

Fig. 2 is a face elevation of a clamping device which is adapted to receive the blanks having opposite faces, preferably flat blanks as shown in the form of standard nuts and feed the same to the various fabricating stations;

Fig. 3 is a plan view of the structure shown in Fig. 2;

Fig. 4 is a longitudinal sectional view of a standard nut blank or unit, and having opposite faces;

Figure 1:
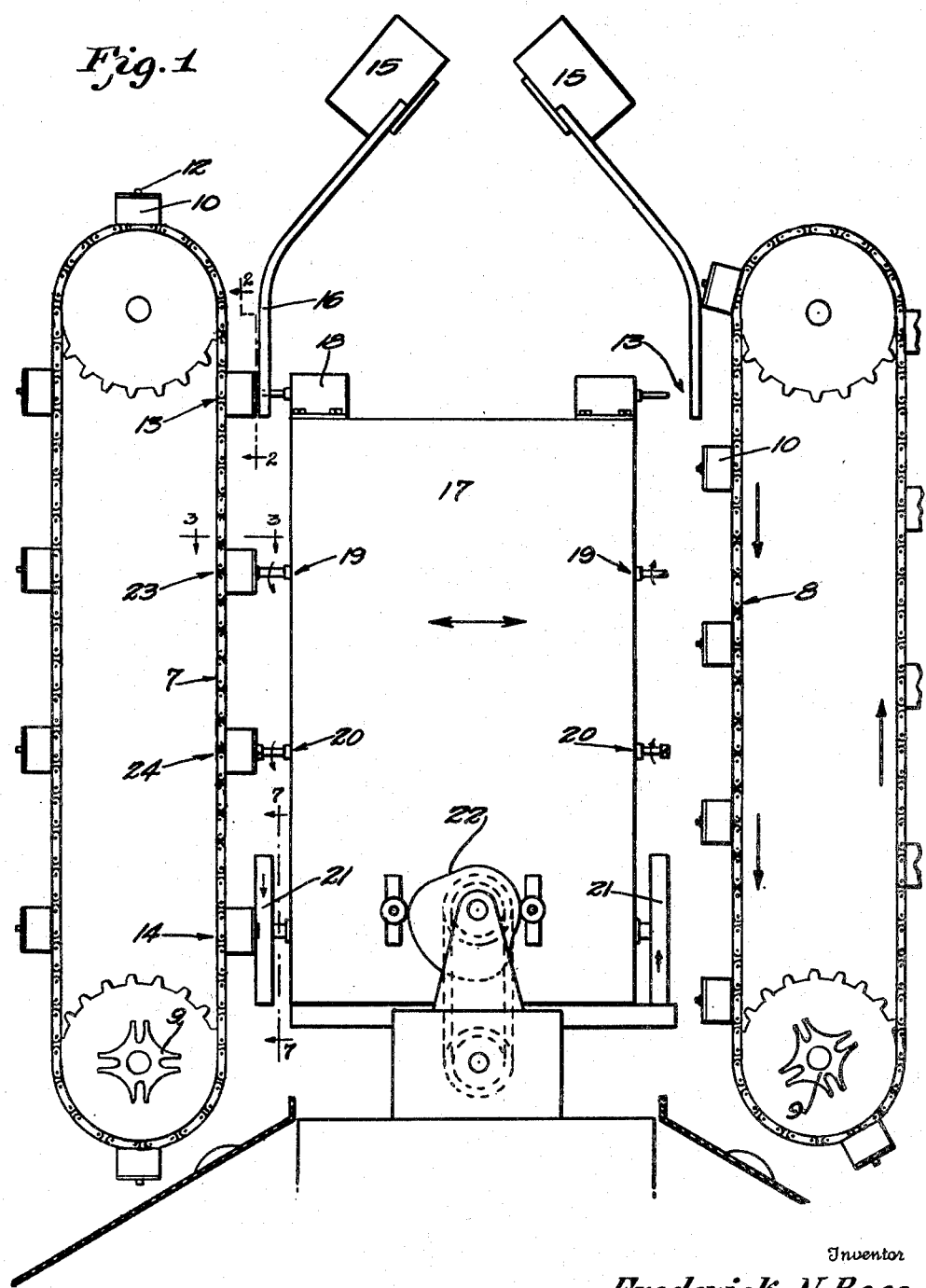
Figure 1 is an elevation view, largely diagrammatic, of a machine for continuously feeding blanks having opposite faces, preferably flat blanks as shown in the form of standard nuts, fabricating the same to form clinch-on nuts and delivering them as a completed article.

Fig. 4a is a longitudinal sectional view of a blank having opposite faces in the form of a flat unit, which may be preferably provided with a bore as shown in Fig. 4b, and then threaded to the nut blank or unit of Fig. 4, which may be a preferred blank or unit for fabricating by the machine of Figs. 1, 2, and 3, by which the improved methods are carried out, although the blanks or units of either Fig. 4a or Fig. 4b may be fabricated by the machine, and subsequently bored or pierced and threaded, or threaded;

Fig. 4b is a longitudinal sectional view of the blank or unit of Fig. 4a after being provided with a bore by boring or piercing;

Fig. 5 is a sectional view similar to Fig. 4 illustrating the first step of fabrication of the blank or unit of Fig. 4 to form a novel clinch-on nut;

Fig. 6 is a view similar to Figure 5 except showing the second fabrication step of the blank or unit of Fig. 4 whereby the clinch-on walls or shank are finally formed;

Fig. 7 is an enlarged detached fragmentary elevation illustrating the step of fabricating the clinch-on parts or shanks of the improved clinch-on nuts to have a plurality of curved faces and corners, and generally D or C shapes; and Fig. 8 is a sectional view taken on line 8—8, of Fig. 7.

Similar numerals refer to similar parts throughout the drawings.

The production of standard nuts such as shown at 2, Fig. 4, has become a highly specialized industry; machines for upsetting and threading blanks to form the standard nuts are so highly specialized that these standard nuts can be purchased on the open market at an extremely low price. As many hundreds of clinch-on nuts are used on every automobile, it will be seen that the question of cost is a very important one. This is one of the reasons why I prefer in many cases to start with a standard nut, because the same can be purchased already threaded, at an extremely low price. A standard nut is however a blank having opposite faces made from flat material which may be either sheet or strip material, usually metal, and most frequently steel.

Instead of placing the blank having opposite faces, as shown herein a standard nut, in an automatic screw machine or the like, and fabricating or cutting the same by tools fed towards the sides as well as the ends or opposite faces, I preferably fabricate the blank, as shown a nut, only by rotating cutting tools fed along their axes of rotation into one end or face of the blanks, the first operation being shown in Fig. 5 wherein the center portion of one end or face of the blank, as shown a nut, is cut away to form a tapered seat or shoulder portion 3 and an internal tapered wall portion 4. A second longitudinal operation cuts down the outer wall so as to form an annular clinch-on wall portion or shank 5, a seat 6 being formed all the way around the blank, as shown a nut. It will be seen that the clinch-on nut as shown in Fig. 6 may be placed in a square hole or a hexagon hole, or, for that matter, any polygon shaped hole. The walls 5 clinch over in the usual way so that the nut 2 is held in clinch-on position in a sheet of metal.

Attachment articles such as clinch-on nuts are frequently preferred with multi-cornered shanks, and the nuts shown in Figs. 7 and 8 have shanks which are generally D or C shape, with the smaller side thereof curved concavely outward, and being preferably cylindric for being formed by a rotary end cutter fed along its axis of rotation.

The larger side of the multi-cornered shank 5 of the nuts of Figs. 7 and 8 is curved convexly outward, and corners of the shanks are formed by the outer side edges of the curved faces thereof, the outer corners being as shown, common to each of the curved shank faces.

The attachment article of Figs. 7 and 8 may thus be described, in other words, as including a flange with a seat face and a shank extending from the seat face, the shank having a plurality of side faces, the side faces being curved about different axes, and being preferably cylindric.

To produce such a clinch-on nut as shown in Figure 6 or as shown in Figs. 7 and 8 on a production scale, and at a minimum of cost, I have provided an improved method which may be carried out by a fabricating machine as best shown in Figure 1. This machine includes two conveyor members 7 and 8 provided with star wheels 9 for intermittently advancing the conveyor means.

Each conveyor unit is provided with a plurality of chucks or clamping members 10, which are best shown in detail in Figures 2 and 3. Each chuck is so arranged as to receive the blanks, as shown the nuts 2 which are clamped in position by suitable pivotally mounted clamping arms 11. A toggle member 12 controls clamping or release of the blanks, as shown the nuts 2, and while no means is shown in Figure 1 for actuating the toggle member 12, it will be understood that the clamping takes place at the position 13 and release takes place after the chucks pass the station 14.

The blanks, preferably flat units, as shown standard nuts, are fed from hoppers 15 to the stations 13 by means of suitable vertically spaced guide members 16. A table 17 provided with centering and fabricating tools is adapted to be moved back and forth between the conveyor members 7 and 8. Opposite sides of the table are provided with oppositely disposed pairs of horizontally spaced centering tools 18; oppositely disposed pairs of horizontally spaced counter-boring or drilling tools 19, for performing the operation shown in Figure 5; oppositely disposed pairs of horizontally spaced tools, the hollow mills 20, for performing the operation shown in Figure 6 and oppositely disposed tools, the milling cutters 21 for giving the clinch over walls or shank a D or C shape with a plurality of corners, as best shown in Figures 7 and 8.

In the operation of the machine, the centering and fabricating or cutting tools 18 to 21 will be continuously rotated by a suitable driving mechanism. The back and forth oscillation of the table 17 by the cam 22 and the step by step advancement of the conveyors 7 and 8 will be synchronized; that is, for example, the conveyor 7 will be moved so that the chucks 10 will be in the position illustrated in Figure 1 and the table 17 will be moved to the left to the position shown. In this position of the table, the centering tools 18 will select two blanks having opposite faces, preferably flat units, as shown nuts, from the vertically positioned chutes 16 and center the same in the chuck 10. Inasmuch as the chucks are positioned the same distance apart as the tools 18, 19, 20 and 21, it will be seen that during the centering action at station 13, the blanks, flat units, or nuts positioned in the chuck at the station 23 will each be subjected in one face thereof to a counter-boring action to produce the tapered wall portion 4 as shown in Fig. 5. Likewise the blanks, flat units, or nuts held in the chuck at station 24 will each be subjected to a hollow milling action to form the clinch over walls or shank 5 as shown in Figure 6. At station 14, the shanks 5 of the two blanks, flat units, or nuts positioned in the chuck 10 will be faced off and formed with a plurality of curved faces and corners by the cylindric end milling cutter 21, as best shown in Figure 7.

While the blanks, flat units, or nuts held by the chucks in the conveyor 7 are being simultaneously fabricated at the respective stations, the conveyor 8 will be advanced one step so that when the fabricating has been completed on the one side the table 17 will be shifted so that the blanks, flat units, or nuts held in the respective chucks on the conveyor 8 will be subjected simultaneously to the respective fabrications of the several tools.

It will be thus seen that by using blanks having opposite faces, preferably flat units, as shown standard nuts, and fabricating the same by means of a machine such as shown in Figure 1, that clinch-on nuts may be produced on a large production scale at an extremely small cost. The fabrication of the face of the blanks, flat units, or nuts so as to form a clinch-on portion or shank is in every case an axial fabrication produced by an axial movement of the fabricating tool; that is, axial with respect to the axis of the thread of the nut, whether or not the thread is formed prior or subsequent to the fabrication of the clinch-on portion, or between steps of such fabrication.

In other words, the feed of each rotary cutting or fabricating tool is along its axis of rotation into one face only of the blank, or other article being subject to the cutting action of the tools of the machine of Fig. 1.

In fabricating a clinch-on nut from a blank having opposite faces, preferably a flat unit, as shown a standard nut, it will be seen that I have produced an annular clinch-on wall or shank 5 formed of the same material as the blank, flat unit, or nut body, thus producing a strong wall which may be easily clinched over. Inasmuch as I reduce a preferably square body, it will be seen that the fabrication of the clinch over wall or shank will produce a seat 6 which completely surrounds the clinch over wall whether the same may be left in an annular shape as in Figure 6 or whether the same is given a D or C shape by the operation shown in Figure 7. This makes for much greater strength as compared to the standard D clinch-on nut, because in such standard D clinch-on nut, there is no seat or backing surface adjacent the cut-away D part. Furthermore, the preferred square base of the nut makes it much easier to hold in position with a suitable clamping tool. As standard nuts have small rounded corners, it will be seen that the clinch-on nut fabricated from the standard nut, will present a neat appearance with corners that will not catch or tear upholstery or the like which must be pushed past the same.

It will be understood that the counterboring tools 19 rotate in a counterclockwise direction, so that when the tool reaches the threads of the preferred nut, there will be a clean cut-off; it will be seen that if the two operated clockwise that the tendency would be to urn the edge of the nut over instead of cleanly cutting it off.

Each of the tools 20 and 21 may be otherwise described as rabbeting tools, each cutting a plurality of curved or arcuate rabbets in one portion of each blank, or other articles subject to their action.

From this standpoint, the nut shown in Figs. 7 and 8 may be described as constituting an attachment article including a body having two opposite transverse end faces, and curved or arcuate rabbets between one of the end faces and the side faces, each rabbet having a transverse seat face located between the end faces and a curved preferably cylindric arcuate face at an angle with the seat face and the one end face.

Each of the improved attachment articles hereof may be otherwise described as including a flange or head and a multi-cornered shank extending from the head, the shank having a plurality of external side faces, each side face comprising a surface of revolution, and being thus adapted to be machine cut by a rotary cylindric cutting tool.

In the preferred form of the article shown in Figs. 7 and 8, the shank is C-shaped, and the larger internal and external curved faces of the C and the end faces of the C, may each be said to be a side surface of the shank comprising a surface of revolution.

The preferred nut shown in Figs. 7 and 8, likewise may be otherwise described as including a head having a threaded aperture formed therein, an arcuate shank extending from one face of the head and about the aperture, and the head having a tapered shoulder formed between the internal face of the arcuate shank and the threaded aperture.

The embodiment of the improved clinch-on nut and the methods of making the same illustrated and described herein attains the above stated objects of the invention, but is by way of example, and the scope of the present invention is not limited to the same or to the particular details thereof, but is commensurate with any and all novel subject matter contained herein, and which may at any time properly under the patent laws be set forth in claims hereof or which may originate herein, the elements of any of the claims being intended to include their reasonable equivalents.

I claim:

1. The method of making from a multi-faced blank an article having a head and a multi-cornered shank extending from the head by subjecting the blank to machining operations of rotary cutting tools each having cutting edges defining surfaces of revolution about its axis of rotation, which includes positioning the blank with one face exposed for being machine cut by the tools and at an angle to their axes of rotation, and by feeding one rotary cutting tool endwise of its axis of rotation into the exposed face of the blank, and by feeding another rotary cutting tool in a direction laterally spaced from the direction of feed of the first tool and endwise of its axis of rotation into the exposed face of the blank, whereby a shank is formed on the machine cut face of the blank, the shank having side faces each of which is a surface of revolution.

2. The method of making from a multi-faced blank an article having a head and a multi-cornered shank extending from the head by subjecting the blank to machining operations of rotary cutting tools each having cutting edges defining surfaces of revolution about its axis of rotation, which includes positioning the blank with one face exposed for being machine cut by the tools and at an angle to their axes of rotation, and by successively feeding rotary cutting tools coaxially endwise of their axes of rotation into the exposed face of the blank for making an annular shank on the blank, and then by feeding another rotary cutting tool in a direction laterally spaced from the direction of feed of the first tool and endwise of its axis of rotation into the annular shank on the blank, whereby a C shank is formed on the machine cut face of the blank, the C shank having side faces each of which is a surface of revolution.

3. The method of making from a multi-faced blank an article having a head and a multi-cornered shank extending from the head by subjecting the blank to machining operations of rotary cutting tools each having cutting edges defining surfaces of revolution about its axis of rotation, which includes positioning the blank with one face exposed for being machine cut by the tools and at an angle to their axes of rotation, and by laterally spacing the axes of rotation of a plurality of the rotary cutting tools, and by feeding the rotary cutting tools endwise of their axes of rotation into the exposed face of the blank, whereby a shank is formed on the machine cut face of the blank, the shank having side faces each of which is a surface of revolution.

4. The method of forming a multi-faced article by subjecting the article to forming operations of rotary forming tools each having forming portions defining a surface of revolution about its axis of rotation, which includes positioning the article with one face exposed for being formed by the tools and at an angle to their axes of rotation, and by feeding one rotary forming tool endwise of its axis of rotation into the exposed face of the article, and by feeding another rotary forming tool in a direction laterally spaced from the direction of feed of the first tool and endwise of its axis of rotation into the exposed face of the article, whereby a shank is formed on the article, the shank having side faces each of which is a surface of revolution.

5. The method of forming a multi-faced article by subjecting the article to forming operations of rotary forming tools each having forming portions defining a surface of revolution about its axis of rotation, which includes positioning the article with one face exposed for being formed by the tools and at an angle to their axes of rotation, and by successively feeding rotary forming tools coaxially endwise of their axes of rotation into the exposed face of the article for making an annular shank on the article, and then by feeding another rotary forming tool in a direction laterally spaced from the direction of feed of the first tool and endwise of its axis of rotation into the annular shank of the article, whereby a C shank is formed on the article, the C shank having side faces each of which is a surface of revolution.

6. The method of forming a multi-faced article by subjecting the article to forming operations of rotary forming tools each having forming portions defining a surface of revolution about its axis of rotation, which includes positioning the article with one face exposed for being formed by the tools and at an angle to their axes of rotation, and by laterally spacing the axes of a plurality of the rotary forming tools, and by feeding the rotary forming tools endwise of their axes of rotation into the exposed face of the article, whereby a shank is formed on the article, the shank having side faces each of which is a surface of revolution.

7. In a method of making from multi-faced blanks articles of manufacture such as attachment units each having a head and a multi-cornered shank extending from the head by subjecting the blanks to machining operations of rotary cutting tools having cutting edges defining surfaces of revolution about their axes of rotation, the steps which include positioning a plurality of the blanks laterally spaced from each other and each with one face exposed for being machine cut by the rotary cutting tools and at an angle to their axes of rotation, and by feeding the rotary cutting tools endwise of their axes of rotation simultaneously into the exposed faces of the plurality of blanks.

8. In a method of forming articles by subjecting the articles to forming operations of rotary forming tools, the steps which include positioning succeeding pairs of the articles laterally spaced from each other, moving said spaced pairs of articles in a step by step movement to a plurality of stations, and simultaneously subjecting the pairs of articles at each of said stations to the forming action of rotary forming tools, each article of some of the pairs being acted upon by a separate forming tool, and the articles of one of the pairs being simultaneously acted upon by the same rotary forming tool.

9. In a method of forming articles by subjecting the articles to forming operations of forming tools, the steps which include positioning succeeding pairs of the articles laterally spaced from each other, moving said spaced pairs of articles in a step by step movement to a plurality of stations, and simultaneously subjecting the pairs of articles at each of said stations to the forming action of forming tools, each article of some of the pairs being acted upon by a separate forming tool, and the articles of one of the pairs being simultaneously acted upon by the same forming tool.

10. The method of fabricating clinch-on units which comprises feeding blanks in alternate step by step movements along opposite sides of an oscillatable fabricating unit having different stations equidistantly spaced, said blanks on each side being arranged in pairs, each pair being equidistantly spaced, and fabricating tools being operative on said unit whereby stopping of the blanks at a plurality of stations and movement of the fabricating unit in a direction towards the blanks will fabricate one face thereof, the blanks on the other side of the fabricating unit being advanced during this fabricating action to new fabricating positions, and then moving said fabricating unit towards said blanks in the new position to fabricate the same, said series of fabrications producing a clinch-on wall on one face of each blank.

11. A method of fabricating standard nuts to produce clinch-on nuts which comprises subjecting one face of the nut to machining operations in alignment with the axis of the nut, said machining producing an outer clinch-on wall with a completely surrounding seat and an inner clinch-on wall with a surface merging with the nut threads, the tool forming the inner clinch-on wall being operated in a counter-clockwise direction and against the pitch of the threads of the nut.

12. In a method of forming articles by subjecting the articles to forming operations of forming tools, the steps which include positioning succeeding pairs of the articles laterally spaced from each other, moving said spaced pairs of articles in a step by step movement to a plurality of stations, and at some of said stations subjecting the pairs of articles to a pair of like tools but different from tools at preceding or succeeding stations.

FREDERICK N. ROSS.